United States Patent [19]

Meinershagen

[11] Patent Number: 4,556,862

[45] Date of Patent: Dec. 3, 1985

[54] VEHICLE DIRECTION SIGNAL AND SLOW WARNING SYSTEM EMPLOYING MOVING PATTERN OF SIMULTANEOUSLY ON LAMPS

[76] Inventor: Charles I. Meinershagen, P.O. Box - 705, Redding, Calif. 96099

[21] Appl. No.: 495,031

[22] Filed: May 16, 1983

[51] Int. Cl.[4] .............................................. B60Q 1/00
[52] U.S. Cl. ....................................... 340/67; 340/82; 340/72
[58] Field of Search ...................... 340/67, 66, 82, 71, 340/72, 81 R, 109, 110, 111, 112, 815.19, 815.21; 315/210

[56] References Cited

U.S. PATENT DOCUMENTS

| | | | |
|---|---|---|---|
| 2,125,668 | 10/1938 | Chase | 177/337 |
| 3,041,579 | 1/1962 | Kanzenbach | 340/82 |
| 3,398,399 | 9/1965 | Brock | 340/82 |
| 3,432,846 | 4/1965 | Jones | 340/339 |
| 3,484,743 | 12/1969 | Stancil | 340/82 |
| 3,500,312 | 4/1966 | Stankovich | 340/67 |
| 3,582,980 | 6/1971 | Marks | 315/210 |
| 3,618,010 | 11/1971 | Suzuki | 340/67 |
| 3,622,980 | 11/1971 | Elledge, Jr. | 340/82 |
| 3,673,565 | 11/1969 | Okuhara | 340/82 |
| 3,697,946 | 10/1972 | Nishioka | 340/82 |
| 3,747,063 | 7/1973 | Hudson, Jr. | 340/109 |
| 3,934,249 | 1/1976 | Sanjana | 340/340 |
| 4,001,810 | 12/1975 | Olsen | 340/338 |

Primary Examiner—John W. Caldwell, Sr.
Assistant Examiner—Jeffery A. Brier
Attorney, Agent, or Firm—David Pressman

[57] ABSTRACT

A signaling device consists of single or multiple rows or banks of lights extending the entire width of both the front (FIG. 13) and rear (FIG. 14) of a vehicle that are alternately turned on and off in such a precise, timed, sequential manner (FIGS. 1-7) so as to give the visual effect of a row of lights moving or traveling in either the right or left direction, moving sign style, depending on which direction the driver of the vehicle indicates. The system also consists of a slowing or stopping warning feature whereas the rear row or rows of lights (112), upon activation of the brake pedal, divides its traveling or running effect from the centerline toward both the right and left sides simultaneously (FIGS. 10-12), giving the visual effect of the rear bank of lights coming toward the observer. With the use of multiple rows of lights (FIGS. 9-12 and 14), the patterns of lights may be staggered or sequenced to create vertical bars (FIG. 9), chevron-shaped arrows (FIG. 10), or diagonal bars (FIGS. 11 and 12) of light moving in the direction desired.

18 Claims, 22 Drawing Figures

REAR VIEW OF TYPICAL PASSENGER MOTOR VEHICLE

FIG.-1 3-LIGHT CYCLE (SINGLE ROW)

LIGHT OFF   LIGHT ON

FIG.-2 3-LIGHT CYCLE

FIG.-3 4-LIGHT CYCLE

FIG.-4 4-LIGHT CYCLE

FIG.-5 4-LIGHT CYCLE

FIG.-6 5-LIGHT CYCLE

FIG.-7 5-LIGHT CYCLE

FIG.-8 3-LIGHT CYCLE

FIG.-9 4-LIGHT CYCLE (3 ROWS)

FIG.-10 4-LIGHT CYCLE

FIG.-11 4-LIGHT CYCLE

FIG.-12 4-LIGHT CYCLE

FIGURE - 13

FRONT VIEW OF TYPICAL PASSENGER MOTOR VEHICLE

FIGURE - 14

REAR VIEW OF TYPICAL PASSENGER MOTOR VEHICLE

FIGURE – 18
131 – VOLTAGE REDUCER / REGULATOR CIRCUIT

FIGURE – 19
130 – CLOCK / TIMER CIRCUIT

VEHICLE DIRECTION SIGNAL AND SLOW WARNING SYSTEM EMPLOYING MOVING PATTERN OF SIMULTANEOUSLY ON LAMPS

BACKGROUND

1. Field of Invention

This invention relates generally to vehicle warning and direction signaling systems, particularly to one designed to provide a significantly improved indication of any intended change in the vehicle's operation.

2. Description of Prior Art

Vehicle signaling systems presently in use include signal lamps mounted on the front and rear of the vehicle on the left and right-hand sides thereof for indicating to others contemplated changes in direction or speed of the vehicle. In general, such systems include a manually operable, three-position direction signal switch and a flasher for selectively flashing the left front and rear or the right front and rear signal lamps for indicating a left or a right turn, respectively. These systems further include a stop signal switch connected in circuit with the direction signal switch to energize continuously both rear lamps when the direction signal switch is in a neutral position and to energize continuously the rear signal lamp on the side opposite the intended turn when the direction signal switch is in an operating position. Vehicles are also presently equipped with a hazard warning switch and a second flasher for simultaneously flashing all of the front and rear lamps. In the past it has also been attempted, e.g., on the Ford Thunderbird and Cougar automobiles, to enhance further the visibility of the turn signals by providing two horizontal rows of lights, one at the left side of the vehicle and the other at the right side. These lights were progressively illuminated, the left row from center to left and the right row from center to right, when the left or right turn signal switches, respectively, were operated. After the entire row of lamps were sequentially turned on, they were then all turned off at the same time and the cycle was re-initiated.

All of the foregoing prior-art direction and/or slow-stop warning systems had significant disadvantages. For one, their successful operation depended on the ability of an observer to relate to a known convention that a blinking light on the corner of a vehicle means an intended turn in that direction. At the same time, the observer had the added burden of distinguishing the blinking turn signal light out of a maze of other blinking lights often found in a dense urban traffic situation, especially at night.

OBJECTS AND ADVANTAGES OF THE INVENTION

Accordingly, several objects and advantages of the invention are to provide a vehicle signaling system which does not require an observer to relate to a known blinking light convention or to distinguish from a maze of other blinking lights in a dense traffic environment.

Other objects and advantages are to provide a system which can be easily incorporated into existing automobile, van, or truck styling and easily retrofitted into most earlier models, to provide a system which complies with existing traffic laws, to provide an observer with a much more natural, easily recognizable, clearly understandable and translatable warning signal, and hence to provide a direction signaling system which easily is usable on an international scale. Further objects and advantages will become apparent from a consideration of the ensuing description and accompanying drawings.

FIGS. 1 TO 7—DIFFERENT MOVING PATTERNS OF LIGHTS

In the following description, several light cycle patterns of light signal systems, according to the invention, are detailed (FIGS. 1 through 7). The one most applicable will depend upon the specific size, and aspect ratio (height vs width) of the bank of lights, and the existing styling of the vehicle (passenger auto, van, truck, etc.). The specific number of lights in each horizontal row can vary, and each bank or display of lights can be either single row or multiple rows in height (FIGS. 9 to 12).

According to the invention, a "traveling" or "chasing" light effect is used for signaling and is achieved by alternately turning on and off certain lights in a row in a precise sequential cadence to provide an effect whereby the row of lights (some on, some off) appears to be continuously, physically moving, as if attached to a moving belt. That is, using appropriate switching, a pattern of one or more unlighted lamps is alternated with one or more illuminated lamps and this pattern is caused to appear to move in either direction along the row, in the fashion of moving signs. Table 1 below illustrates how a three-light cycle pattern (one on, two off), as shown in FIG. 1, is made to appear to move to the right, as would be done for a right-turn signal.

TABLE 1

Figure 1:
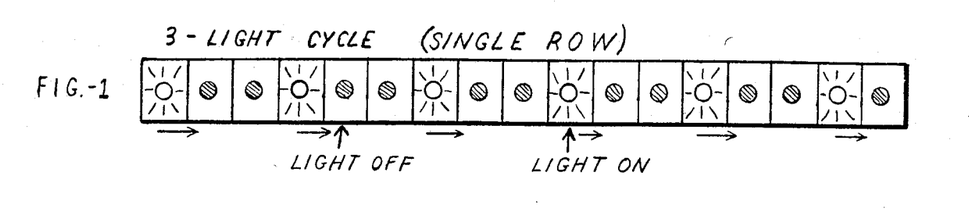
FIG. 1 illustrates one pattern of a single row of lights that operates on a three-light cycle (one on, two off) and which is used in either the front or rear of a vehicle in accordance with the invention.
Figure 2:
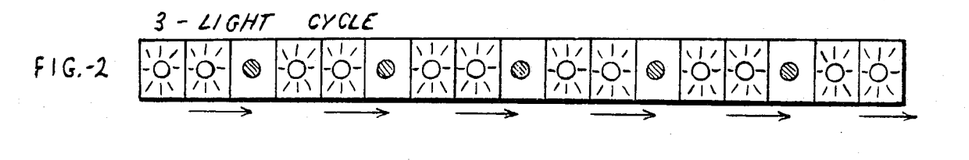
FIG. 2 illustrates a similar pattern of a single row of lights using a different three-light cycle (two on and one off).
Figure 3:
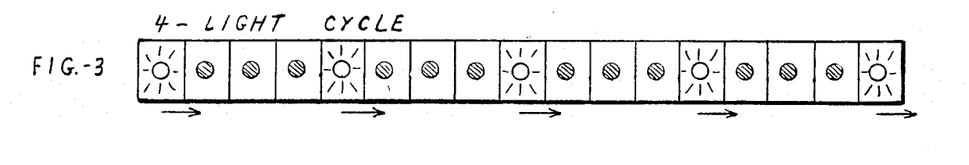
FIG. 3 illustrates a four-light cycle pattern (one on and three off).

Moving Pattern Operation of FIG. 1 Lights, Right Turn

| Time 1 | | X | O | O | X | O | O | X | O | O | X | O | O | X |
|---|---|---|---|---|---|---|---|---|---|---|---|---|---|---|
| Time 2 | (.1 sec later) | O | X | O | O | X | O | O | X | O | O | X | O | O |
| Time 3 | (.1 sec later) | O | O | X | O | O | X | O | O | X | O | O | X | O |
| Time 4 | (.1 sec later) | X | O | O | X | O | O | X | O | O | X | O | O | X |
| Time 5 | (.1 sec later) | O | X | O | O | X | O | O | X | O | O | X | O | O |
| Time 6 | (.1 sec later) | O | O | X | O | O | X | O | O | X | O | O | X | O |

(X = Lamp On; O = Lamp Off)
(Time Interval = 0.10 Second)

In the case of a left turn signal, the same light pattern would be sequenced so as to appear to move to the left, as shown in Table 2 below.

TABLE 2

Moving Pattern Operation of FIG. 1 Lights, Left Turn

| Time 1 | | X | O | O | X | O | O | X | O | O | X | O | O | X |
|---|---|---|---|---|---|---|---|---|---|---|---|---|---|---|
| Time 2 | (.1 sec later) | O | O | X | O | O | X | O | O | X | O | O | X | O |
| Time 3 | (.1 sec later) | O | X | O | O | X | O | O | X | O | O | X | O | O |
| Time 4 | (.1 sec later) | X | O | O | X | O | O | X | O | O | X | O | O | X |
| Time 5 | (.1 sec later) | O | O | X | O | O | X | O | O | X | O | O | X | O |
| Time 6 | (.1 sec later) | O | X | O | O | X | O | O | X | O | O | X | O | O |

(X = Lamp On; O = Lamp Off)
(Time Interval = 0.10 Second)

Table 3 below illustrates the operation of the lamps of FIG. 4 (four-light cycle, two on and two off) during right-turn signaling.

TABLE 3

Figure 4:
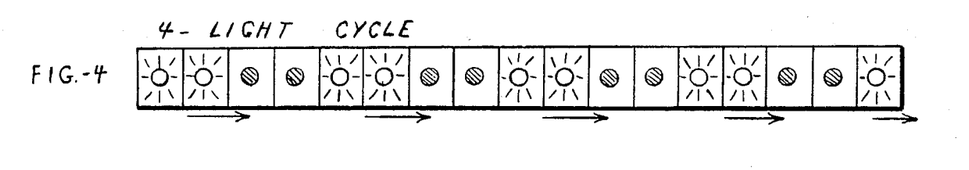
FIG. 4 illustrates a four-light pattern (two on and two off).
Figure 5:
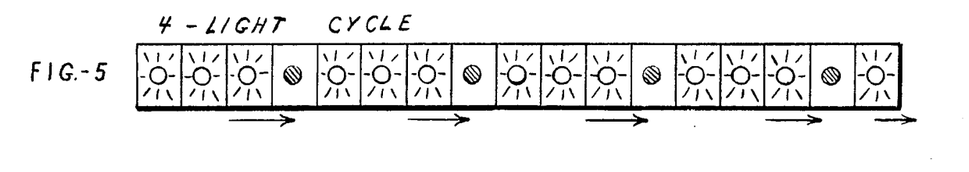
FIG. 5 illustrates a four-light pattern (three on and one off).
Figure 6:
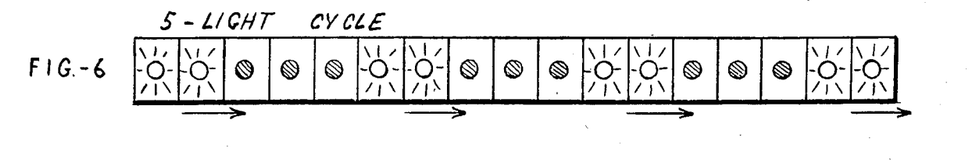
FIG. 6 illustrates a five-light pattern (two on and three off).
Figure 7:
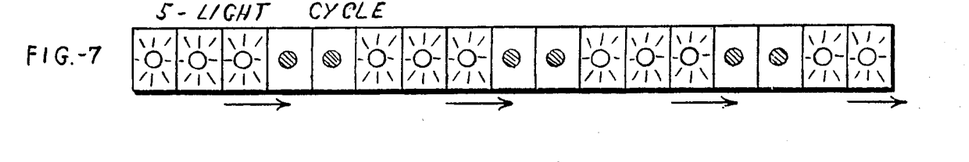
FIG. 7 illustrates a five-light pattern (three on and two off).

Moving Pattern Operation of FIG. 4 Lights, Right Turn

| Time 1 | | X | X | O | O | X | X | O | O | X | X | O | O | X | X |
|---|---|---|---|---|---|---|---|---|---|---|---|---|---|---|---|
| Time 2 | (.1 sec later) | O | X | X | O | O | X | X | O | O | X | X | O | O | X |
| Time 3 | (.1 sec later) | O | O | X | X | O | O | X | X | O | O | X | X | O | O |
| Time 4 | (.1 sec later) | X | O | O | X | X | O | O | X | X | O | O | X | X | O |
| Time 5 | (.1 sec later) | X | X | O | O | X | X | O | O | X | X | O | O | X | X |
| Time 6 | (.1 sec later) | O | X | X | O | O | X | X | O | O | X | X | O | O | X |

(X = Lamp On, O = Lamp Off)
(Time Interval = 0.10 Second)

This light pattern sequencing gives a distinctly different visual effect from the progressive three-blinking light turn signal system earlier used on the 1965-1971 Ford Thunderbird and 1967-1971 Cougar automobiles, as illustrated on Table 4 below.

TABLE 4

Sequencing Pattern of Prior-Art Lights, Right Turn

| Time 1 | | O | O | O |
|---|---|---|---|---|
| Time 2 | (.1 sec later) | X | O | O |
| Time 3 | (.1 sec later) | X | X | O |
| Time 4 | (.1 sec later) | X | X | X |
| Time 5 | (.1 sec later) | O | O | O |
| Time 6 | (.1 sec later) | X | O | O |
| Time 7 | (.1 sec later) | X | X | O |
| Time 8 | (.1 sec later) | X | X | X |

(X = Lamp On, O = Lamp Off)
(Time Interval = 0.10 Second)

This old system of sequentially turning on successive lights in a row still was easily confused with the maze of other blinking lights in a dense, urban traffic environment. I have found that a row of lights which are operated to provide a moving pattern of on and off lights, according to the invention, provides a far more demarcated, far easier to distinguish, and far more attention-grabbing visual effect, especially when used in an urban traffic situation with many other blinking lights in the area.

The examples presented in FIGS. 1 to 7 represent only seven basic light patterns of the many possible. Only the three-, four-, and five-light cycle patterns are illustrated; however, patterns utilizing more lights in each repeating cycle may be possible.

The speed at which the pattern of lights is moved can easily be varied to operate the desired optical effect, and in certain situations is necessary to avoid a simple back and forth oscillating visual effect. In the example of Table 1, the time between successive movements of the pattern preferably is approximately 0.1 second, but can be varied within the scope of the invention.

Figure 8:
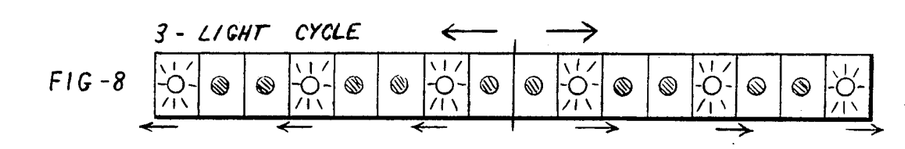
FIG. 8 illustrates a slow/stop warning display for the rear row of lights on a vehicle.

FIG. 8—STOP OR SLOW WARNING

An additional variation of these visual light displays is the slowing and/or stopping warning feature for the rear bank or row of lights on a motor vehicle. This display is produced when the right half of the row of lights are sequenced so as to appear to move to the right, while simultaneously the left half of the rear row of lights are sequenced so as to appear to move to the left, as shown in FIG. 8.

Table 5 below illustrates the operation of such a single row of lamps sequenced so as to create the slow warning feature of the system.

TABLE 5

Moving Pattern Operation of FIG. 8

| | | | | | | | | | | | | | | | |
|---|---|---|---|---|---|---|---|---|---|---|---|---|---|---|---|
| Time 1 | | O | O | X | O | O | X | O | O | X | O | O | X | O | O |
| Time 2 (.1 sec later) | | O | X | O | O | X | O | O | O | O | X | O | O | X | O |
| Time 3 (.1 sec later) | | X | O | O | X | O | O | X | X | O | O | X | O | O | X |
| Time 4 (.1 sec later) | | O | O | X | O | O | X | O | O | X | O | O | X | O | O |
| Time 5 (.1 sec later) | | O | X | O | O | X | O | O | O | O | X | O | O | X | O |
| Time 6 (.1 sec later) | | X | O | O | X | O | O | X | X | O | O | X | O | O | X |

(X = Lamp On, O = Lamp Off)
(Time Interval = 0.10 Second)

This creates the visual effect of the entire row or bank of lights coming toward the observer.

Figure 10:
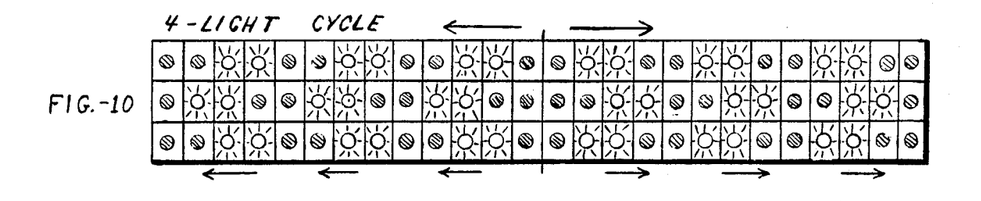
FIG. 10 illustrates a four-light pattern used with three rows of lights and also demonstrating the slow/stop warning feature.
Figure 11:
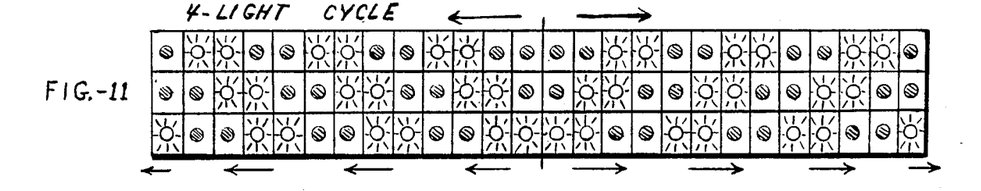
FIG. 11 illustrates the four-light cycle pattern as used with three rows of lights, the slow/stop warning feature, and a different illumination pattern.
Figure 12:
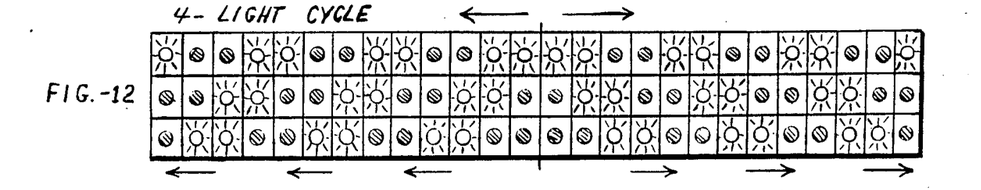
FIG. 12 illustrates the four-light pattern with three rows of lights, the slow/stop warning feature, and a different sequencing pattern.

This warning display can also be accomplished even more strikingly on the multiple-row displays (FIGS. 10 through 12).

The latter slow/stop warning feature preferably is activated when the brake pedal switch is closed and the vehicle is still in motion; it would be shut off once the vehicle comes to a stop, even if the brake switch is still closed. This function can be implemented by either a direct override of the direction signaling circuitry or as an addition to its function.

Within the foregoing system of light displays, there are also possible different pattern spacings of lights on the multiple-row banks of lights of FIGS. 9 to 12.

FIGS. 9 THROUGH 12—MULTIPLE LIGHT ROWS

Figure 9:
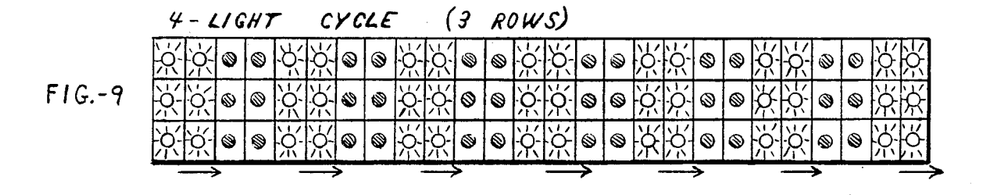
FIG. 9 illustrates the four-light cycle pattern (two on and two off) used with three rows of lights.

A three-row display, for example in FIG. 9, gives the visual appearance of vertical bars of light moving horizontally when corresponding lights of all three rows are sequenced together.

A visual appearance of chevron-shaped arrows can be created by having the center row sequenced one light ahead of both the top and bottom rows, as shown in FIG. 10.

Also, the appearance of diagonal bars, slanted either to the right or left, can be created, as shown in FIGS. 11 and 12, respectively, by sequencing each row of lights either one light ahead or one light behind the adjacent rows. Once again, the examples illustrated here are only a few of the many possible variations.

Figure 13:
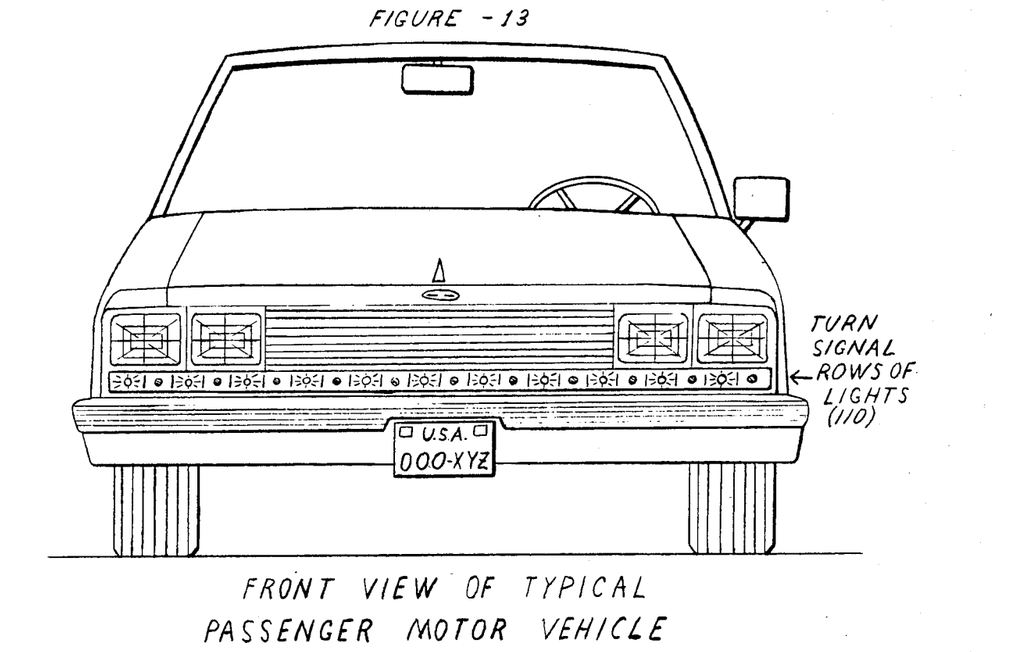
FIG. 13 illustrates how a single row of signaling lights are mounted on the front of a typical modern passenger motor vehicle.
Figure 14:
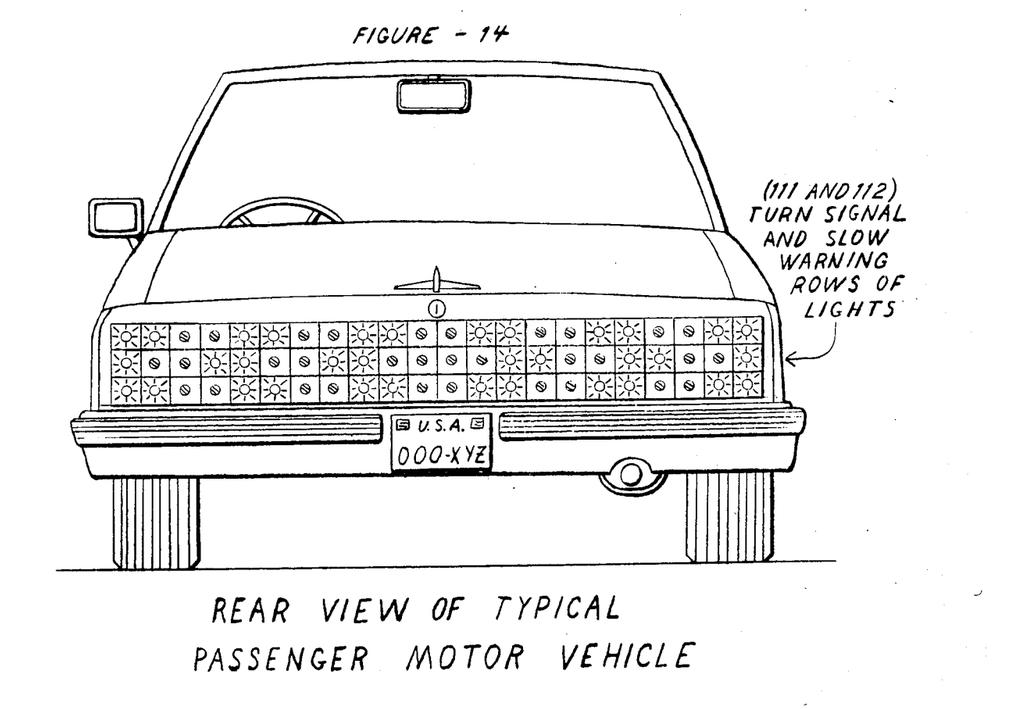
FIG. 14 illustrates how three rows of red slow/stop warning and/or direction signaling lights are mounted on the rear of a typical modern passenger motor vehicle.

FIGS. 13 AND 14—LIGHTS ON PASSENGER VEHICLE

FIG. 13 illustrates one possible placement of a row of direction signal lights 110 on the front of a modern passenger vehicle. The particular location of the row of signal lights would be determined largely by the styling and type of the motor vehicle, but primarily governed by the specifications of the existing state motor vehicle codes. FIG. 14 shows the rear of a modern passenger vehicle, and the location of a three-row bank of direction signal 111 slow warning 112 lights is illustrated. As with the front of a vehicle, the particular location of a rear bank of lights is determined by styling, vehicle codes, size, and type of vehicle.

The rows of banks or lights may be either incorporated into the vehicle at the design and manufacture or offered as an add-on accessory feature. The rear row or signal/warning lights may even be placed inside or near the rear window, provided said location did not impair the rear view vision of the driver or violate existing motor vehicle codes.

The precise means of controlling or driving the banks or rows of lights can be achieved in any of a number of well-known electrical, electro-mechanical, or solid-state-integrated circuits. Three possible circuits are illustrated in FIGS. 15 through 22.

Figure 15:
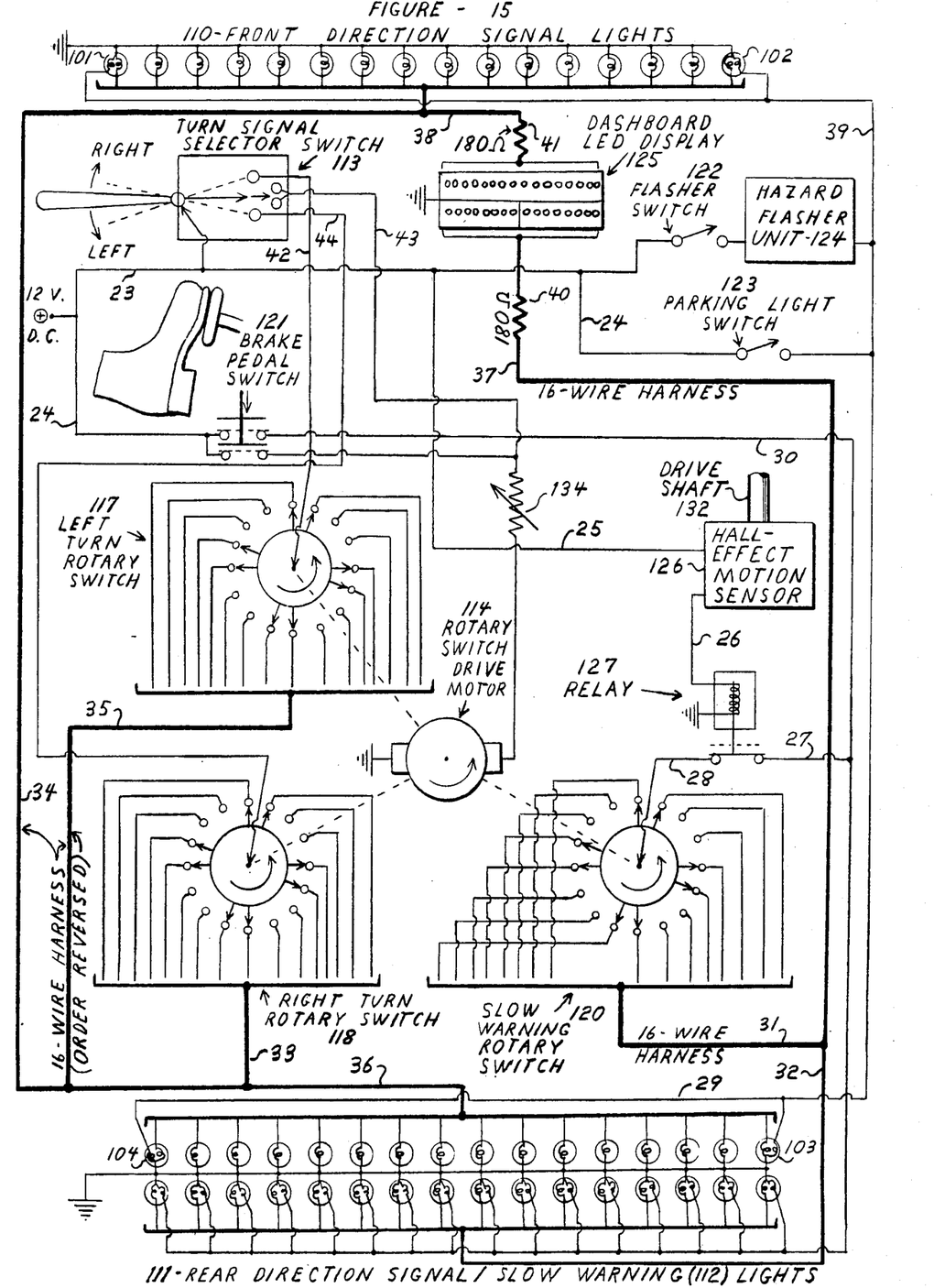
FIG. 15 is a schematic of an electro-mechanical circuit for controlling the front and rear rows of signal/warning lights of FIG. 4.

FIG. 15—ELECTRO-MECHANICAL CONTROL CIRCUIT

Figure 16:
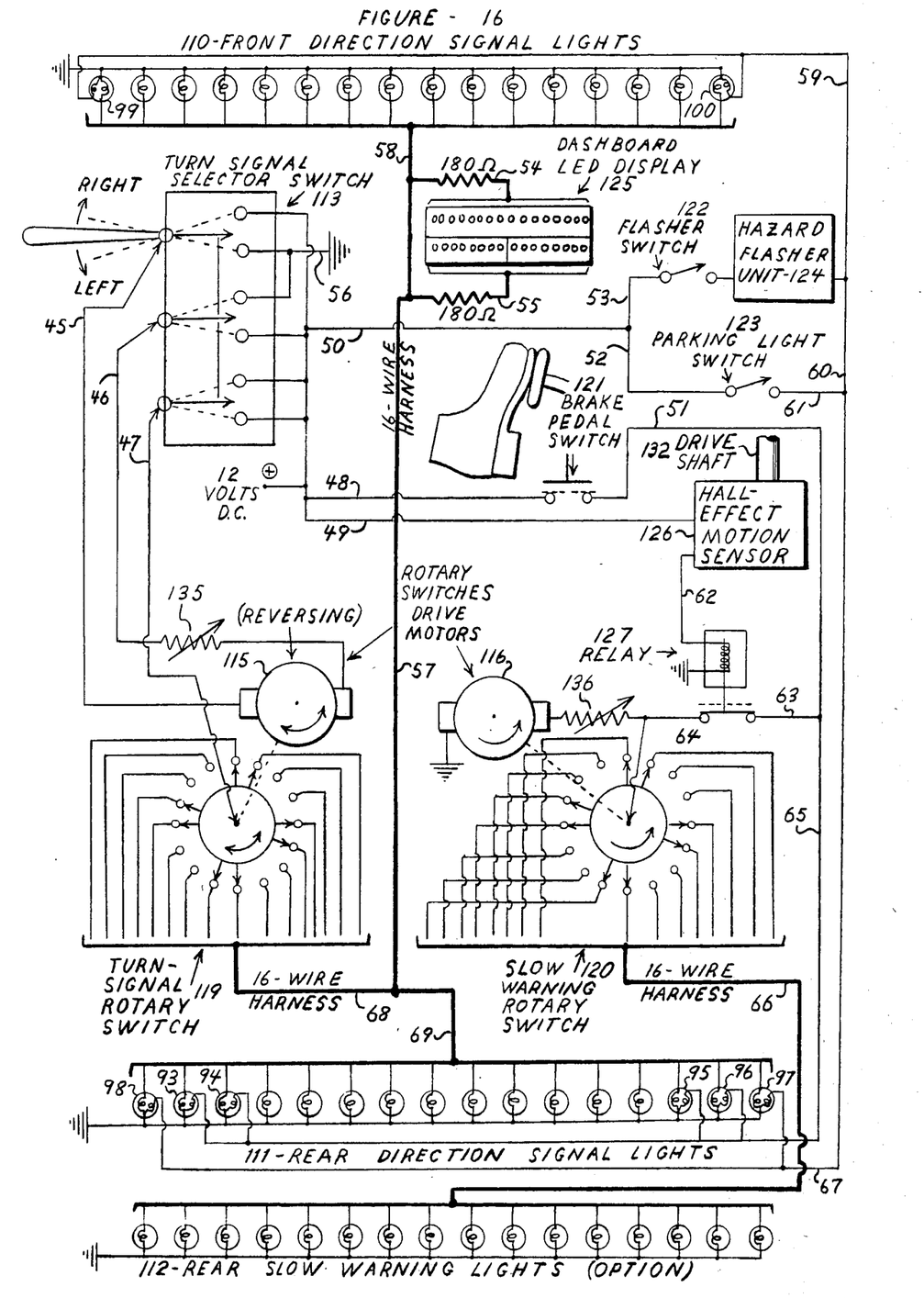
FIG. 16 is a schematic of an electro-mechanical circuit for controlling the front and rear rows of direction signal lights of FIG. 4 with the rear slow/stop warning light system being as an optional feature.

One method of controlling or driving the front and rear rows of direction signal/slow warning lamps is through electro-mechanical circuitry. Two such circuits are illustrated in FIGS. 15 and 16. Each circuit uses rotary switches driven by twelve-volt dc servo motors, either reversing or nonreversing.

The first circuit (FIG. 15) is powered directly by the vehicle's twelve-volt dc electrical system. Positive twelve-volt lines 23, 24, 137, 138, and 25 supply a turn signal selector switch 113, a brake pedal switch 121, hazard flasher unit 124 and parking light switch 123, and a Hall-effect motion sensor 126, respectively.

When the driver wishes to indicate a right turn, turn selector switch 113 is closed in a manner which energizes both lines 43 and 44, which in turn supply current to both a rotary switch drive motor 114 and a right turn rotary switch 118, respectively. The rotating contacts of rotary switch 118 are arranged in this example to display the four-light cycle pattern of FIG. 4 (two lights on and two lights off) on the front and rear rows of signal/warning lights, 110 and 111; this causes the four-light pattern to start and immediately and continuously appear to move to the right. This occurs because right rotary turn switch 118 has a rotor with four sets of two contacts or wipers each and sixteen fixed contacts. Each set of two wiper contacts always contacts or mates with two adjacent fixed contacts and the four adjacent fixed contacts. Sandwiching the mated or contacted fixed contacts are not mated or contacted. As the rotor turns, its eight wipers energize sequential spaced pairs of fixed contacts, thereby causing the "two lights on" light pattern to effectively move to the right.

The speed at which the sets of two illuminated lights translate across the rows is variable via the rheostat 134 which controls the rotational speed of switch drive motor 114. Preferably motor 114 rotates at 37.5 rpm so that the lights in rows 110 and 111 switch at a frequency of 10 Hz, with substantially instant switching. Power is supplied to rear row of signal lights 111 through a 16- wire harness 33 and 36, and also to the front row of signal lights 110 through 16-wire harness 34, simultaneously.

If the driver indicates a left turn, the turn signal selector switch routes current to lines 42 and 43, which supply current to left turn rotary switch 117 and rotary switch drive motor 114, respectively. The rotating contacts in left turn rotary switch 117 are arranged, in this example, to create the same four-light cycle pattern as does the right turn rotary switch. However, the order of the wires in the 16-wire harness 35 are reversed as compared with harness 33. This causes the light pattern to translate across both the front 110 and rear 111 signal light rows in the opposite direction; i.e., to the left.

By thus providing a "traveling" light effect, observers on the outside see a flow of light which extends the entire width of both the front and rear of the vehicle, moving in the direction of the intended turning of the vehicle. This flow of light is easily recognizable and would stand out against a surrounding maze of other blinking lights.

A slow warning feature is provided when the vehicle is in motion (drive shaft rotating) and brake pedal switch 121 is closed. Closure of switch 121 supplies current to rotary switch drive motor 114 and to line 30; this illuminates one filament of each of the rear row of dual filament lamps simultaneously. As long as the vehicle is in motion, current is also supplied to the slow warning rotary switch 120 via lines 27 and 28. Once again the rotating contacts of the switch are arranged, in this example, to display the four-light cycle pattern of FIG. 4. Thus the other filaments of the 16 dual filament rear slow warning lamps 112 are sequentially illuminated via the 16-wire harnesses 31 and 32. The 16 stationary contacts are so connected to the 16-wire harness 31 so as to produce the pattern of lights translating from the center of the rear row to both the right and left sides simultaneously (FIG. 10).

Thus, when a driver applies the brake pedal to slow or stop the vehicle, the rear row(s) of warning light sequence in such a manner so as to create the visual effect of the row coming toward the observer following behind. This visual effect is easily and readily recognizable and vividly stands out against other blinking lights in a dense traffic environment.

A Hall effect motion sensor 126, or equivalent, is connected directly to the vehicle's drive shaft 132. When drive shaft 132 is rotating, sensor provides a closed circuit, thereby energizing relay 127 via line 26. When drive shaft 132 stops rotating, power supplied by line 26 to relay 127 is interrupted, whereby current to slow warning rotary switch 120 is also interrupted.

The direction signal/slow warning system of FIG. 15 also features a dashboard L.E.D. (light-emitting diode) display 125, which consists of dual rows of light emitting diodes (16 each), in which each L.E.D. is connected to a corresponding lamp on the front and rear displays. This dashboard display is connected, via 16-wire harnesses 38 and 37, to the direction signal and slow warning systems, respectively, and the voltage is reduced via a set of sixteen 180 Ω resistors 41 and 40. This provides the driver with a visual display of the operation of both systems.

By closing the flasher switch 122, hazard flasher unit 124 sends 0.8 Hz pulses (50 pulses/minute) to four corner dual filament lamps 101, 102, 103, and 104 via lines 39 and 29; this causes one filament of each of these lamps 101, 102, 103, and 104 to be simultaneously illuminated at a rate of 0.8 Hz. This provides a hazard warning feature similar to that of most modern passenger vehicles. These same lamps can also be illuminated steadily by closing the parking light switch; this is normal nighttime operation.

FIG. 16—ALTERNATIVE ELECTRO-MECHANICAL SYSTEM

Another possible method of electro-mechanically driving the front and rear signal/slow warning rows of lamps is illustrated in FIG. 16. In this circuit layout, the slow warning system is arranged as a separate optional circuit with its own rotary switch 120 and switch drive motor 116.

Positive twelve-volt lines 48, 49, 52, and 53 supply a brake-pedal switch 121, a Hall-effect motion sensor 126, a parking-light switch 123, and a hazard-flasher unit 124, respectively. The turn-signal selector switch is grounded through line 56. Line 50 supplies current to lines 52 and 53.

The directional signal system is controlled by a single reversible rotary switch 119, which is driven by a single reversible twelve-volt motor 115. When the driver of the vehicle indicates a right turn, turn signal selector switch 113 routes current to lines 46 and 47 which in turn energize rotary switch drive motor 115 and turn signal rotary switch 119, respectively. Again, for example, the rotating contacts of the switch are placed so as to generate the four-light cycle pattern of FIG. 4 on the front 110 and rear 111 direction signal lamps which are connected via 16-wire harnesses 68, 57, 58, and 69. As in the circuit of FIG. 15, the rotational speed of drive motor 115; i.e., the switching frequency of the signal lamps, is controlled by rheostat 135.

When the driver of the vehicle indicates a left turn, turn signal selector switch 113 supplies current to lines 45 and 47 which, in turn, supply current to the rotary switch 119 and its drive motor 115. However, this causes motor 115 and thus rotary switch 119 to rotate in the opposite direction from that which occurs when the right turn signal is activated.

As in the circuit of FIG. 15, the system features a dashboard L.E.D. display 125 which corresponds directly to the light display on the front (110) and rear (111) signal lamps and is connected via switch-wire harnesses 54 and 55, respectively. The slow warning system may or may not be connected to this L.E.D. display.

The control and drive circuitry for the slow warning system in the circuit of FIG. 16 is essentially the same as was described in FIG. 15 with the exception that rotary switch 120 has its own separate drive motor 116 and the rotary switch controls its own separate rear row of single filament warning lamps 112 via sixteen-wire harness 66. The speed of the drive motor 116; i.e., the switching frequency of the warning lights, is controlled by the rheostat 136. A Hall effect motion 126 sensor, or equivalent, is again connected to the vehicle's drive shaft 132 and shuts off the slow warning display when the vehicle comes to a stop. When drive shaft 132 stops rotating, power supplied by line 62 to relay 127 is interrupted, thereby interrupting the flow of twelve-volt direct current on line 64 to slow-warning rotary switch 120.

In the circuit of FIG. 16, when the brake pedal switch 121 is closed, current is sent via lines 51 and 65 to illuminate one filament of each of only four dual filament lamps 93, 94, 95, and 96 on the rear of the vehicle.

The hazard flasher feature is activated the same as in the circuit of FIG. 15; i.e., one filament of each of the four corner dual lamps 97, 98, 99, and 100 are illuminated simultaneously by closing the flasher switch 122. These same lamps can also be illuminated steadily by closing parking-light switch 123; this will send twelve-volt DC power to lines 59, 60, 61, 63, and 67. This, again, is normal nighttime operation.

Figure 17:
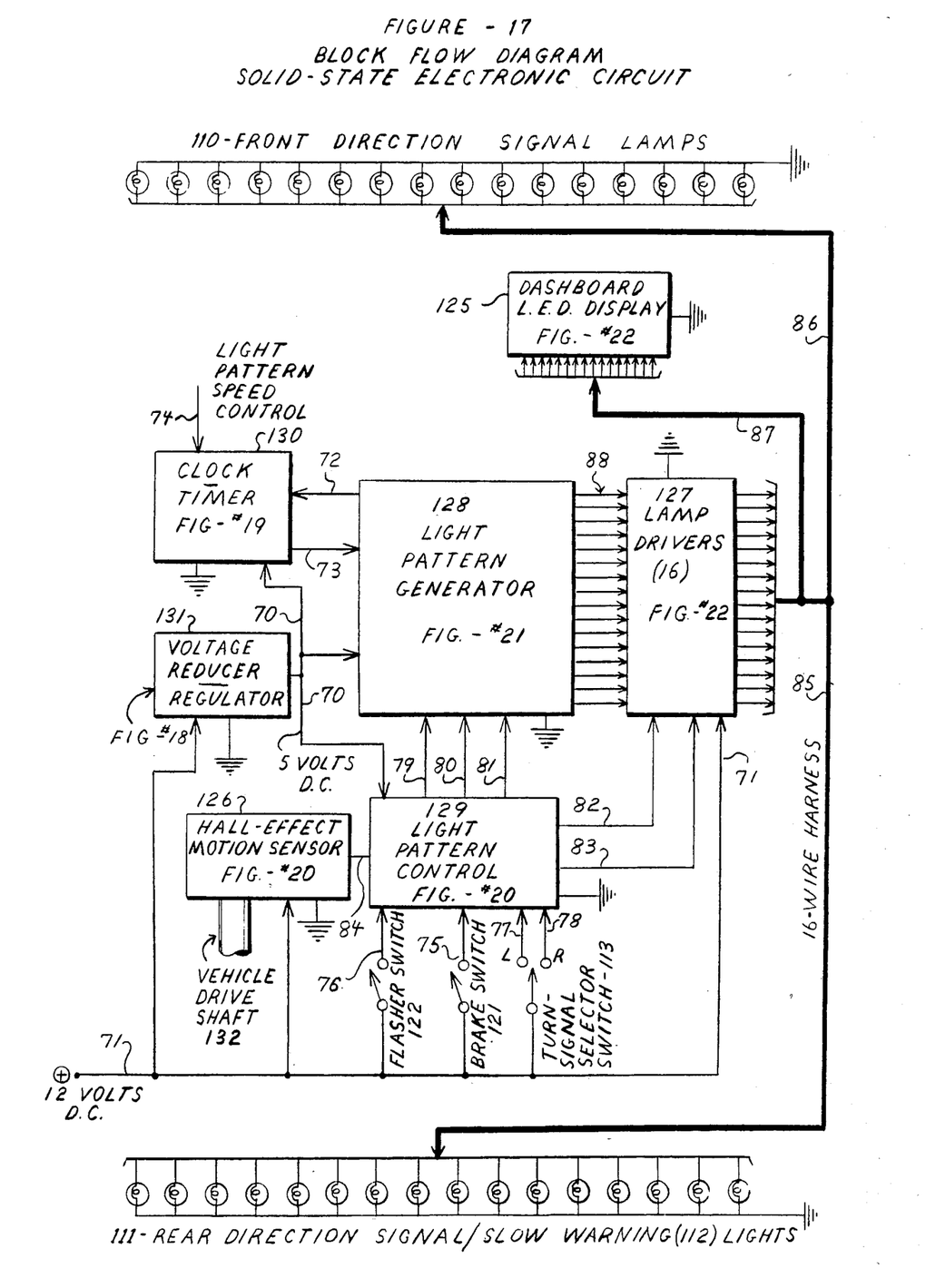
FIG. 17 is an electronic block flow diagram of a system for controlling the front and rear signal/warning lamps.

FIG. 17—SOLID STATE ELECTRONIC CONTROL CIRCUIT

Another possible method of controlling or driving the front and rear direction signal/warning rows of lamps is through solid state circuitry utilizing integrated circuit (IC) chips. An example of such a circuit is illustrated in FIGS. 17 through 22.

Figure 18:
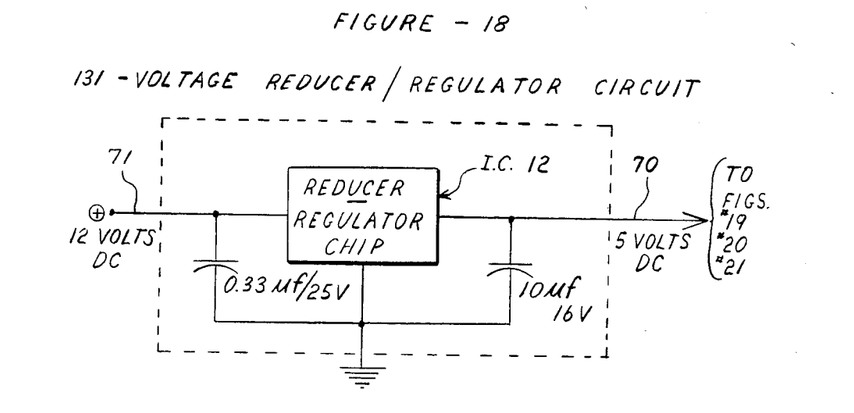
FIG. 18 illustrates a solid state voltage reducer/regulator circuit used in the system of FIG. 17.
Figure 19:
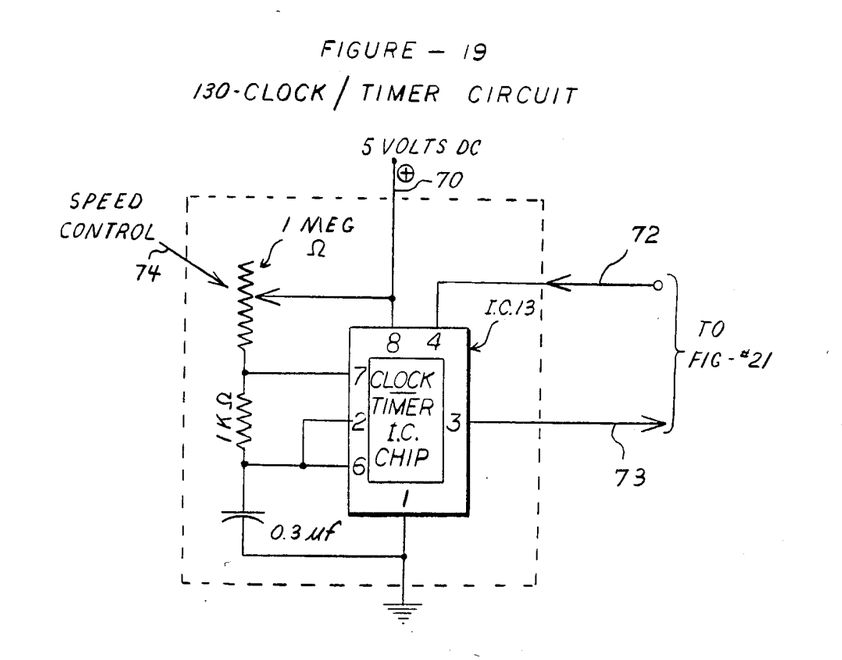
FIG. 19 illustrates a clock/timer circuit with a manual frequency control as used in the system of FIG. 17.

The entire circuit is powered by twelve-volt direct current via line 71. The light pattern control 129 circuit (FIG. 20) receives inputs from brake switch input 75, a hazard flasher switch input line 76, a turn signal selector switch 113, which can be positioned in either the right (78), left (77), or neutral positions, and from a Hall effect motion sensor 126 input line 84, which is connected directly to the vehicle's drive shaft 132. Light pattern control circuit 129 is powered by a five-volt dc input 70 from a voltage reducer/regulator 131 (FIG. 18).

When any of input lines 79, 80, or 81 go to five volts dc, current is sent through line 72 to a clock/timer 130 circuit (FIG. 19) causing it to produce a clock pulse current through input line 73 which goes to the four up/down counters, IC 1, IC 2, IC 3, and IC 4. The rate of this clock pulse current is controlled by a light pattern speed control rheostat 74, which in turn controls the speed at which the light pattern moves across the rows of signal/warning lights on the front and rear of the vehicle.

Figure 20:
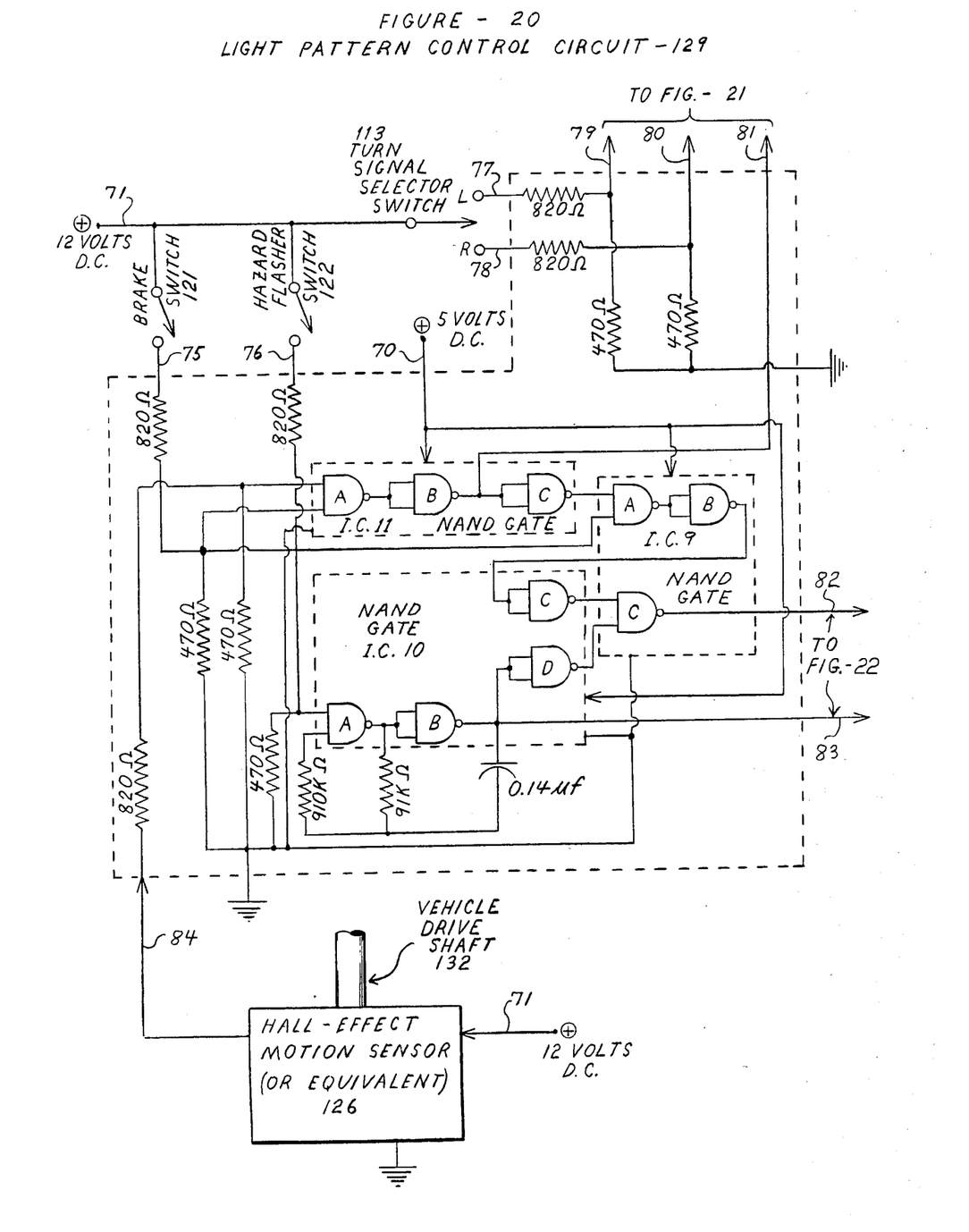
FIG. 20 illustrates a light pattern selector circuit which is used in the system of FIG. 17.

Light pattern control 129 circuit is a series of logic gates which direct the pattern generator according to the conditions of various inputs 75, 76, 77, 78, or 84. Pattern control outputs, lines 82 and 83, also go directly to lamp drivers 133 which override the inputs of pattern generator 128 under certain conditions, such as actuation of either brake switch input line 75 or hazard switch input line 76.

Figure 21:
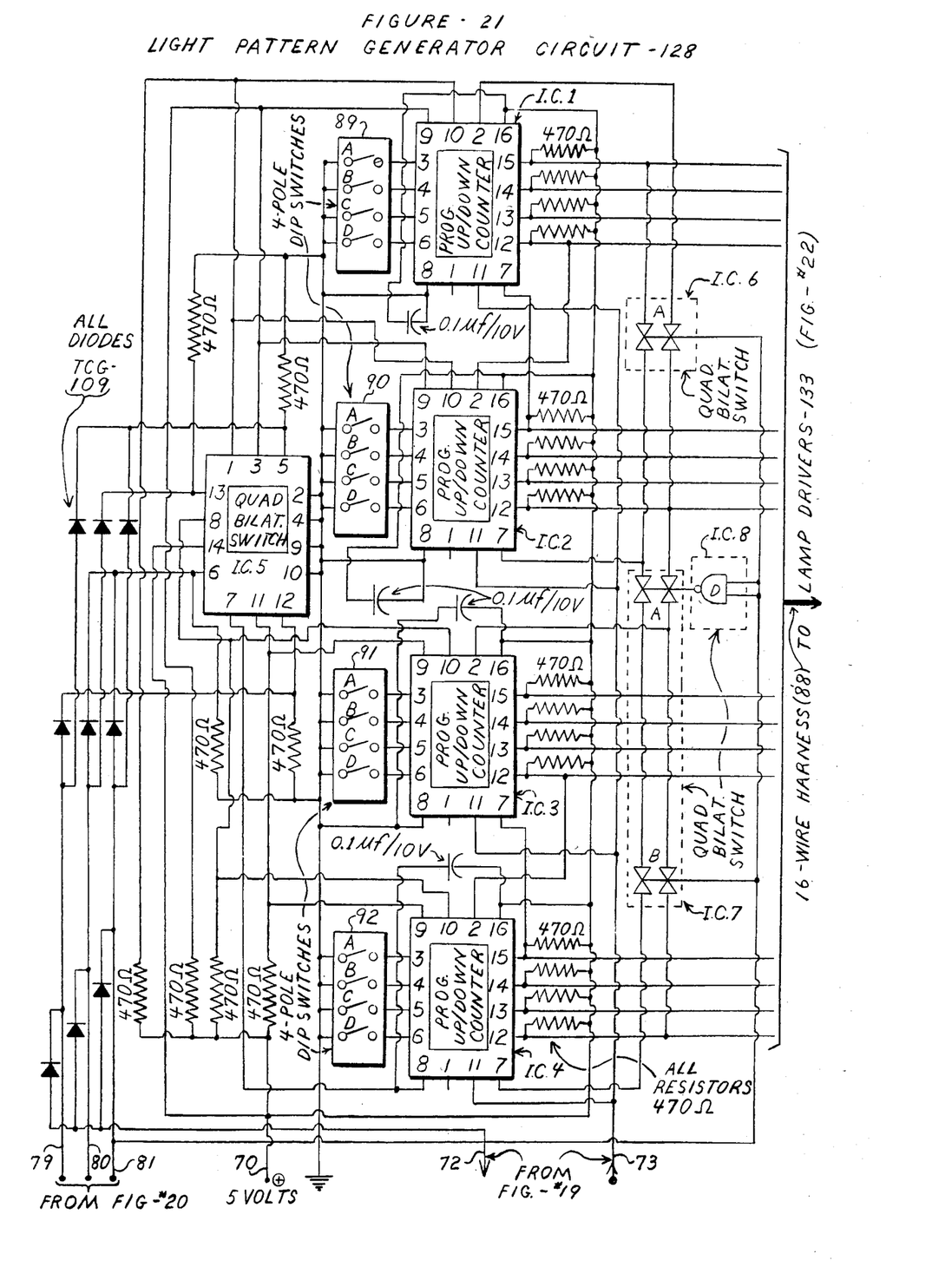
FIG. 21 illustrates a light pattern generator circuit which utilizes a quad bilateral switch and a programmable b.c.d. up/down counter.
Figure 22:
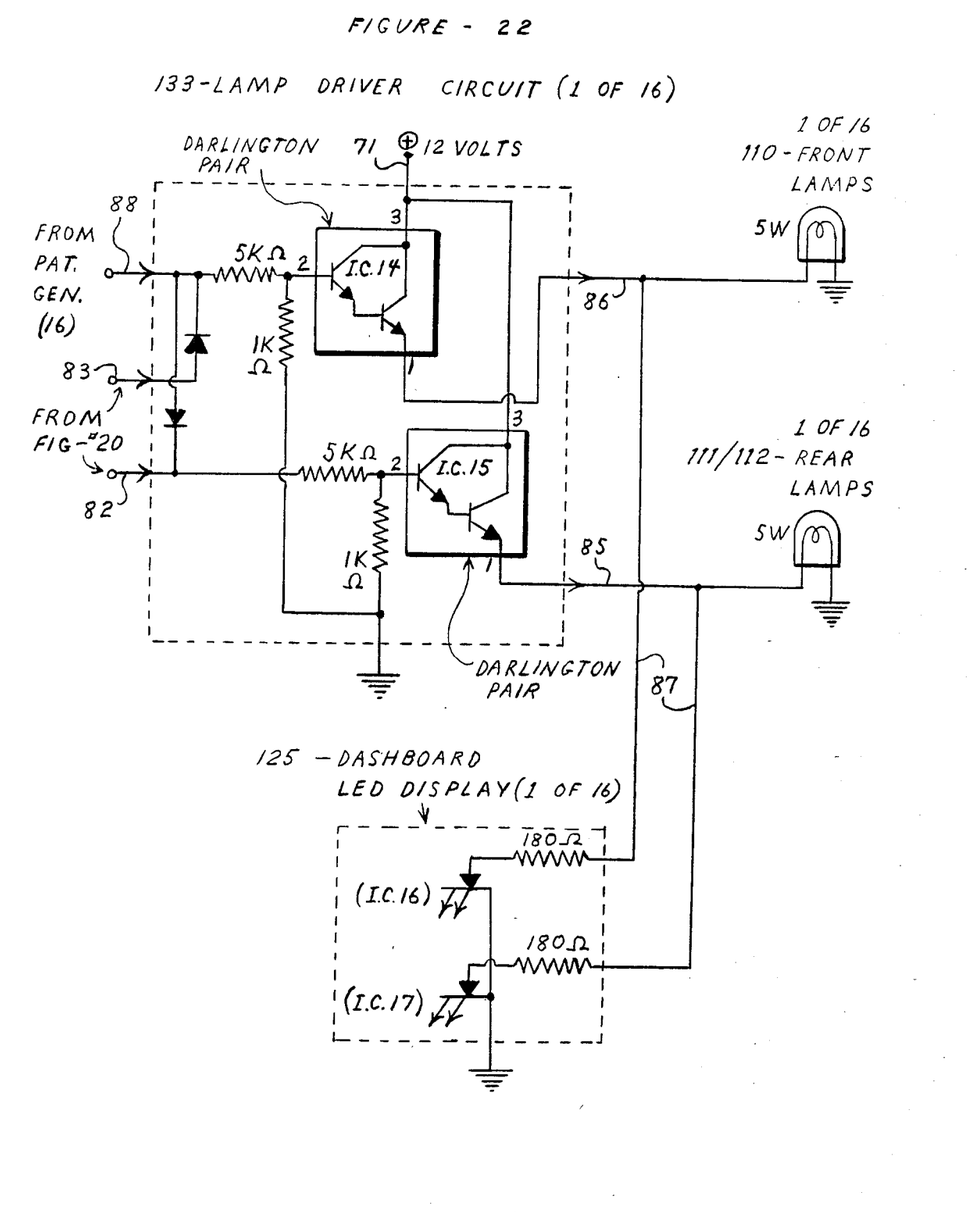
FIG. 22 illustrates one of sixteen lamp drivers as used in the system of FIG. 17.

The left or right inputs, 77 or 78, from the turn signal selector 113 are reduced from twelve volts dc down to five volts dc and sent to pattern generator 128 through lines 79 and 80, respectively. When brake switch 121 closes, brake input line 75 goes to twelve volts and then is reduced to five volts and is sent to IC 11A and to IC 9A. When the vehicle is in motion, input 84 from Hall effect motion sensor 126 is twelve volts dc; this is reduced to five volts and sent to IC 11A. Since IC 11A and IC 11B comprise an AND gate, the output of IC 11B goes to five volts, producing an output to line 81 and an input to IC 11C. IC 11C is an inverter, and the output would be zero.

When the vehicle stops (drive shaft 132 stops rotating), output 84 of motion sensor 126 becomes zero and output line 81 becomes zero also. This produces a five-volt dc output from IC 11C to IC 9A. Since IC 9A and IC 9B comprise another AND gate, IC 9B produces a five-volt output if the vehicle is stopped and the brake switch input line 75 is on. This is the input to IC 10C. When hazard flasher switch input line 76 is twelve volts, it is reduced to five volts and starts IC 10A and IC 10B, which comprises a 50 pulse per minute (0.8 Hz) flasher. IC 10B sends 0.8 Hz pulses to output line 83 and to IC 10D. Since IC 10C, IC 10D, and IC 9C together comprise an OR gate when either IC 10C or IC 10D have a five-volt input, the output of IC 9C at output line 82 is five volts. Line 82 is steady as long as the vehicle is stopped and brake switch 121 is closed. Output line 82 will pulse (flash) whenever the vehicle is in motion and hazard flasher switch 122 is closed and input line 76 is twelve volts.

Light pattern generator circuit 128 produces a selected light pattern (FIGS. 1 through 7) and causes it to move across the rows of signal/warning lights in a specific direction. The patterns are completely selectable, and the direction of the movement of part or all of the pattern is controlled by the light pattern control circuit 129.

The various patterns are manually selected by means of four 4-pole, two-position, dip (dual in-line package) switches 89, 90, 91, and 92. In order to program the pattern generator circuit to produce the four-light cycle pattern (FIG. 4), for example, switches 89A, 89B, 90A, 90B, 91A, 91B, 92A, and 92B are closed, while switches 89C, 89D, 90C, 90D, 91C, 91D, 92C, and 92D are left open. Thus the four-light cycle pattern of lights, with two lights on and two lights off, is generated on front and rear signal/warning light rows 110 and 111. A second example of this manual selection procedure could be to generate the three-light cycle pattern, with one light on and two lights off (FIG. 1). This is done by closing dip switches 89A, 89D, 90C, 91B, 92A, and 92D and leaving dip switches 89B, 89C, 90A, 90B, 90D, 91A, 91C, 91D, 92B, and 92C open. In this circuit the light patterns are selectable whereas a production version would most likely have the light pattern preset into the IC's.

The direction of each half of the four programmable up/down counters, IC 1, IC 2, IC 3, and IC 4, is determined by the control inputs to the quad bilateral switches, IC 5, IC 6, IC 7, and IC 8, through blocking diodes. Each input, control, or output line is conditioned to the proper voltage state by resistors.

When input line 79 goes to five volts dc (corresponding to a left turn indication), current is sent to a quad bilateral switch control IC 5, pins 5 and 12. This connects pins 3 and 4; also connects pins 10 and 11. A ground then appears on pin 9 of the up/down counters, IC 1, IC 2, IC 3, and IC 4, and allows them to count in one direction only. When input line 80 goes to five volts dc (corresponding to a right turn indication), current is sent to quad bilateral switch control IC 5, pins 6 and 13. This connects pins 8 and 9; also connects pins 1 and 2. A ground then appears on pin 10 of the up/down counters, IC 1, IC 2, IC 3, and IC 4, allowing them to run in the opposite direction.

If input line 81 is zero, switch controls IC 6A are off, switch controls IC 7A are on due to IC 8D (which is an inverter) and switch controls IC 7B are off. Under these conditions, all four up/down counters, IC 1, IC 2, IC 3, and IC 4, are connected in series and they count all the way across the row in either direction. When input line 81 goes to five volts (corresponding to a slow warning indication), current is sent to pins 5 and 6 of switch control IC 5 which connects pins 8 and 9; also connects pins 3 and 4. A ground then appears on pin 9 of up/down counters IC 1 and IC 2 and also on pin 10 of up/down counters, IC 3 and IC 4. Current is also sent to switch control, IC 6A, IC 8D, and IC 7B, which changes the condition of the switch controls and changes the connections so that one-half of the programmable up/down counters, IC 1 and IC 2, will run in one direction and the other half of counters IC 3 and IC 4 will run in the opposite direction. This produces the light pattern (FIGS. 8, 10, 11, and 12) and (Table 5); i.e., the slow warning light display.

Sixteen lamp drivers 133, (FIG. 22), receive current input from light pattern generator 128 through sixteen input lines 88. In each of lamp drivers 133, if input line 88 goes to five volts, then IC 14 and IC 15 turn on through a blocking diode. If input line 83 from pattern control 129 goes to five volts, then both IC 14 and IC 15 turn on. Input lines 88 and 83 are from the turn signal system and the hazard flasher warning system, respectively. If input line 82 goes to five volts, then only IC 15 turns on, while IC 14 is blocked by diode input line 82. Line 82 goes positive upon activation of brake switch 121. When either IC 14 or IC 15 turns on, each of their rows of lamps and their associated L.E.D.'s are illuminated via lines 85, 86, and 87.

| Components List for FIGS. 17 Through 22 | |
|---|---|
| IC 1 | Programmable B.C.D. Up/Down Counter (TCG74L5194) |
| IC 2 | Programmable B.C.D. Up/Down Counter (TCG74L5194) |
| IC 3 | Programmable B.C.D. Up/Down Counter (TCG74L5194) |
| IC 4 | Programmable B.C.D. Up/Down Counter (TCG74L5194) |
| IC 5 | Quad Bilateral Switch (TCG4016B) |
| IC 6 | Quad Bilateral Switch (TCG4016B) |
| IC 7 | Quad Bilateral Switch (TCG4016B) |
| IC 8 | Quad Bilateral Switch (TCG4016B) |
| IC 9 | Quad Nand Gate (TCG4011B) |
| IC 10 | Quad Nand Gate (TCG4011B) |
| IC 11 | Quad Nand Gate (TCG4011B) |
| IC 12 | Reducer/Regulator (TCG931) |
| IC 13 | Clock/Timer (TCG955M) |
| IC 14 | Darlington Pair (TCG268) |
| IC 15 | Darlington Pair (TCG268) |
| IC 16 | L.E.D. (Light Emitting Diode)(TCG3019) |
| IC 17 | L.E.D. (Light Emitting Diode)(TCG3019) Silicon Diode (TCG109) |

While the above description contains many specificities, these should not be construed as limitations on the scope of the invention, but rather as an exemplification of one preferred embodiment thereof. Many other variations are possible, for example the signal/warning rows of lights could be placed inside the rear window of a motor vehicle and be made of any width desired. Also, these rows or banks or signal/warning lights can be used on trucks, ships, aircraft, helicopters, railroad equipment, outside elevators, and in any location necessary or desired. Instead of causing the pattern of on and off lights to appear to move by switching lights on and off, it can be made to move physically by mounting the lights on a moving endless belt. The visual effects produced by the "traveling" lights render this system a significant improvement over conventional blinking light warning systems. Accordingly, the scope of the invention should be determined not by the embodiment illustrated, but by the appended claims and their legal equivalents.

I claim:

1. A method of signaling the condition of a movable vehicle in the presence of traffic, comprising the following steps:

(1) providing a movable vehicle, (2) providing a row of individual lamps on a side of said vehicle, and (3) turning said lamps on and off to form a moving pattern of turned-on lamps, as follows:

(a) turning on a plurality of spaced-apart lamps simultaneously so that each lamp in said turned-on plurality will present one visual characteristic and the rest of said lamps, including at least one lamp physically intermediate and separating said turned-on plurality of lamps, will present a different visual characteristic, and so that said turned-on plurality of lamps will be visually distinguishable from the rest of said lamps and present a recognizable predetermined pattern of spaced-apart and simultaneously-turned-on lamps, (b) turning off said previously-turned-on plurality of said lamps and simultaneously turning on a new and different plurality of spaced-apart lamps, said different plurality of lamps being adjacent said respective previously-turned-on plurality of lamps in one direction along said row, such that said recognizable predetermined pattern of spaced-apart lamps will appear to have moved along said row to a new position in said one direction, and (c) thereafter repeating said step (b) so that each last-turned-on plurality of lamps will be turned off and simultaneously a new plurality of said lamps will be turned on, each new plurality of turned-on lamps being adjacent the last-turned-on plurality of lamps in said one direction along said row, such that said recognizable predetermined pattern of spaced-apart lamps will appear to move along said row in said one direction, whereby said vehicle will present a moving pattern of turned-on lamps which will be recognizable in the presence of conventional flashing static turn signals and traffic lamps.

2. The method of signaling the condition of a movable vehicle in the presence of traffic of claim 1 wherein said step (c) comprises periodically again turning on said first-turned-on plurality of lamps and thereafter again turning on each succeeding plurality of turned-on lamps in said one direction along said row so that said predetermined pattern will appear to move continuously and repetitively from one end of said row to the other end thereof.

3. The method of signaling the condition of a movable vehicle in the presence of traffic of claim 2 wherein said step (1) comprises providing a motor vehicle which can travel on the surface of the earth, said step (2) comprises providing a horizontal row of lamps on a back vertical surface of said vehicle, and said step (3) includes providing a switch for causing said pattern of said lamps of said one visual characteristic to move either to the left or to the right, under control of an operator of said vehicle, thereby to provide recognizable turn-signal indicators.

4. The method of signaling the condition of a movable vehicle in the presence of traffic of claim 1 wherein said step (3) includes causing said lamps to be turned on in a pattern such that each turned-on lamp is separated from the next turned-on lamp by a plurality of turned-off lamps.

5. The method of signaling the condition of a movable vehicle in the presence of traffic of claim 1 wherein said step (3) comprises causing said lamps to be turned on in a pattern such that a plurality of groups of lamps are turned on, each group consisting of a plurality of adjacent lamps, each group of turned-on lamps being separated from the next group of turned-on lamps by a single turned-off lamp.

6. The method of signaling the condition of a movable vehicle in the presence of traffic of claim 1 wherein said step (3) comprises causing said lamps to be turned on in a pattern such that a plurality of groups of lamps are turned on, each group consisting of a plurality of adjacent lamps, each group of turned-on lamps being separated from the next group of turned-on lamps by a group of turned-off lamps.

7. The method of signaling the condition of a movable vehicle in the presence of traffic of claim 1, further including providing at least one other identical row of said lamps so as to provide a plurality of paralleled adjacent identical rows of such lamps, and wherein said step (3) comprises turning on said lamps such that corresponding lamps in said respective rows are always in the same state so that said predetermined pattern extends in a direction normal to the direction of said rows.

8. The method of signaling the condition of a movable vehicle in the presence of traffic of claim 7 wherein each lamp of each row is provided in vertical alignment with its corresponding lamp in the adjacent row.

9. The method of signaling the condition of a movable vehicle in the presence of traffic of claim 1, further including providing at least one other row of said lamps, such that a plurality of paralleled adjacent identical rows of such lamps are provided, and wherein said step (3) comprises turning on said lamps such that a plurality of lamps in said rows will have the same state and such that lamps which have the same state will extend in a direction which is other than normal to the direction of said rows, thereby to provide a pattern of turned-on lamps which is slanted to the direction of said rows.

10. The method of signaling the condition of a movable vehicle in the presence of traffic of claim 9, further including providing at least one more row of said lamps, such that at least three parallel adjacent rows of lamps are provided, and wherein said step (3) comprises turning on said lamps so that the pattern of turned-on lamps is chevron-shaped.

11. The method of signaling the condition of a movable vehicle in the presence of traffic of claim 1 wherein said step (3) consists of turning on said lamps such that said pattern moves in two opposing directions along said row.

12. The method of signaling the condition of a movable vehicle in the presence of traffic of claim 1 wherein said step (1) comprises providing a motor vehicle which can travel on the surface of the earth and wherein said step (2) comprises providing a horizontal row of lamps on a back vertical surface of said vehicle.

13. The method of signaling the condition of a movable vehicle in the presence of traffic of claim 12 wherein said step (2) comprises providing a horizontal row of said lamps on a front vertical surface of said vehicle, and wherein said step (3) comprises turning on each row of lamps on the front and back of said vehicle in similar patterns.

14. The method of signaling the condition of a movable vehicle in the presence of traffic of claim 13 wherein said step (3) consists of selectively causing said pattern of turned-on lamps to move in two opposing directions in response to operation of the braking system of said vehicle and to turn off all of said lamps in response to cessation of motion of said vehicle.

15. The method of signaling the condition of a movable vehicle in the presence of traffic of claim 12 wherein said step (3) includes providing a switch, actuation of which is arranged to cause said pattern of turned-on lamps to move either to the left or to the right, under control of an operator of said vehicle, thereby to provide recognizable turn-signal indicators.

16. The method of signaling the condition of a movable vehicle in the presence of traffic of claim 12 wherein said step (3) consists of providing a switch, actuation of which is also arranged to cause said pattern of turned-on lamps to selectively move in two opposing horizontal directions simultaneously, under control of an operator of said vehicle, thereby to provide a hazard or stop indication.

17. The method of signaling the condition of a movable vehicle in the presence of traffic of claim 1 wherein said step (3) comprises providing an electro-mechanical control circuit, including a rotary motor, for causing said pattern of turned-on lamps to move.

18. The method of signaling the condition of a movable vehicle in the presence of traffic of claim 1 wherein said step (3) comprises providing an electronic control system, including an electronic distributor, for causing said pattern of turned-on lamps to move.

* * * * *